No. 817,344. PATENTED APR. 10, 1906.
E. E. SLICK.
ROLLING MILL.
APPLICATION FILED AUG. 21, 1902.

7 SHEETS—SHEET 1.

WITNESSES
Thomas W. Bakewell
L. A. Conner

INVENTOR
Edwin E. Slick

No. 817,344. PATENTED APR. 10, 1906.
E. E. SLICK.
ROLLING MILL.
APPLICATION FILED AUG. 21, 1902.

7 SHEETS—SHEET 3.

WITNESSES
INVENTOR

No. 817,344. PATENTED APR. 10, 1906.
E. E. SLICK.
ROLLING MILL.
APPLICATION FILED AUG. 21, 1902.

7 SHEETS—SHEET 4.

WITNESSES
Thomas W. Bakewell

INVENTOR
Edwin E. Slick

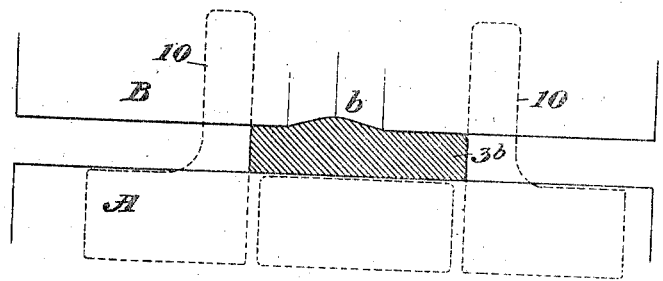
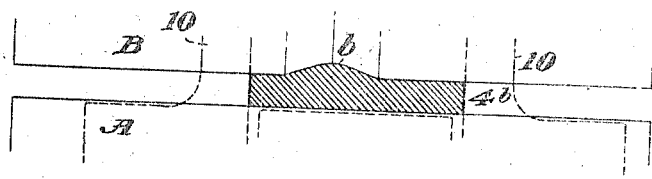
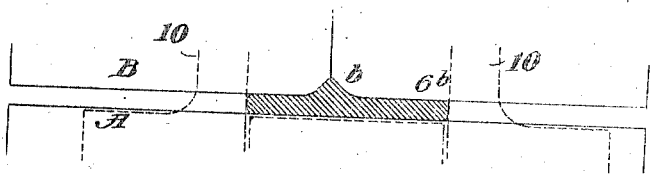
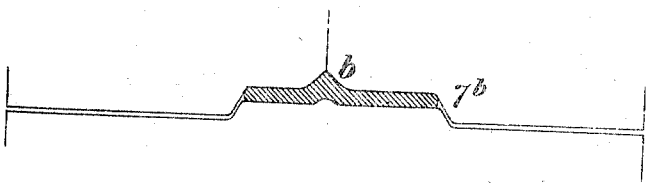
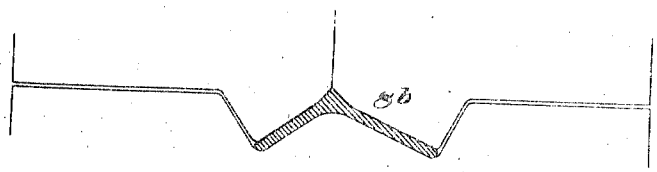
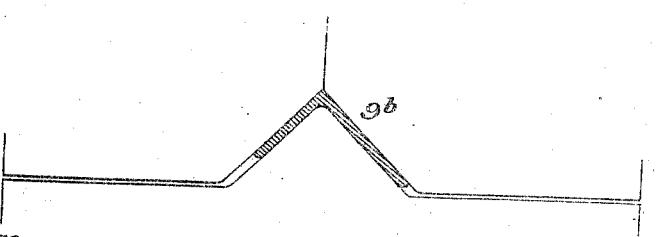

No. 817,344. PATENTED APR. 10, 1906.
E. E. SLICK.
ROLLING MILL.
APPLICATION FILED AUG. 21, 1902.
7 SHEETS—SHEET 6.
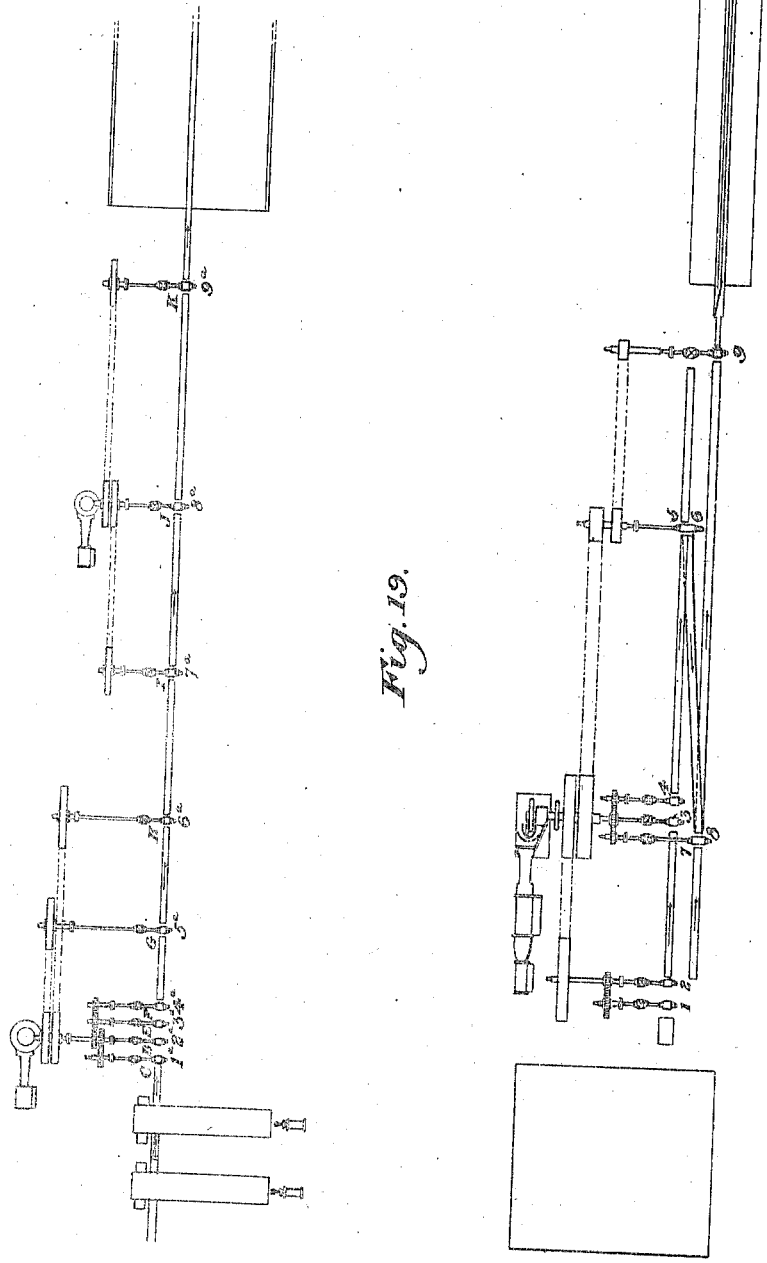

UNITED STATES PATENT OFFICE.

EDWIN E. SLICK, OF PITTSBURG, PENNSYLVANIA.

ROLLING-MILL.

No. 817,344.      Specification of Letters Patent.      Patented April 10, 1906.

Application filed August 21, 1902. Serial No. 120,588.

*To all whom it may concern:*

Be it known that I, EDWIN E. SLICK, of Pittsburg, Allegheny county, Pennsylvania, have invented a new and useful Rolling-Mill, of which the following is a full, clear, and exact description, reference being had to the accompanying drawings, forming part of this specification, in which—

Figure 1:
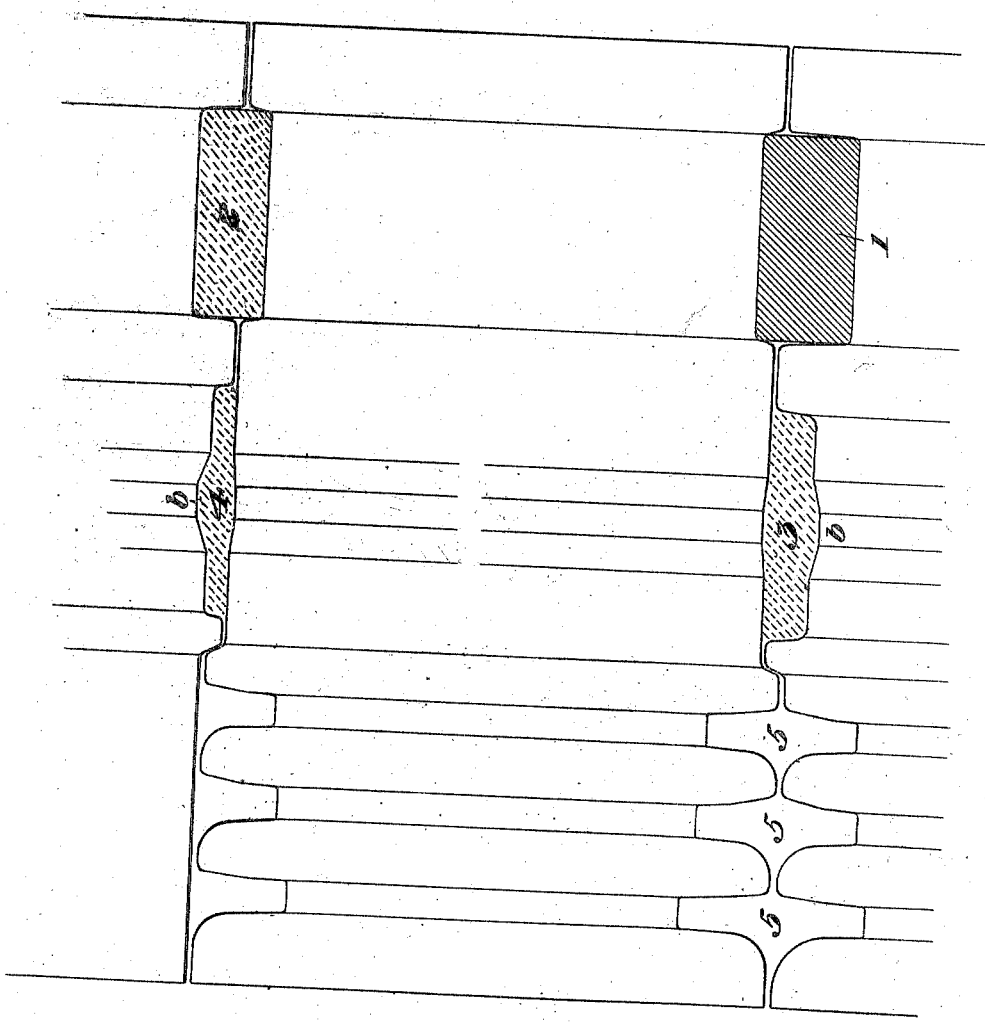
Figure 2:
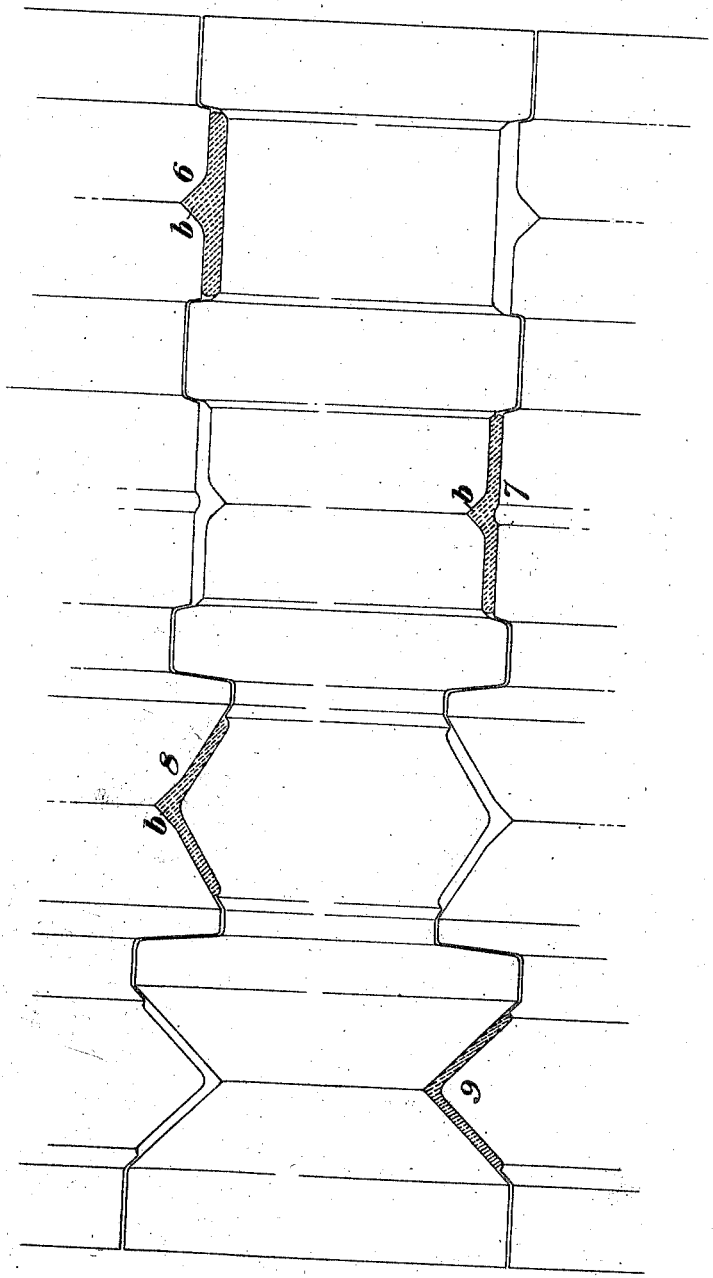
Figure 20:
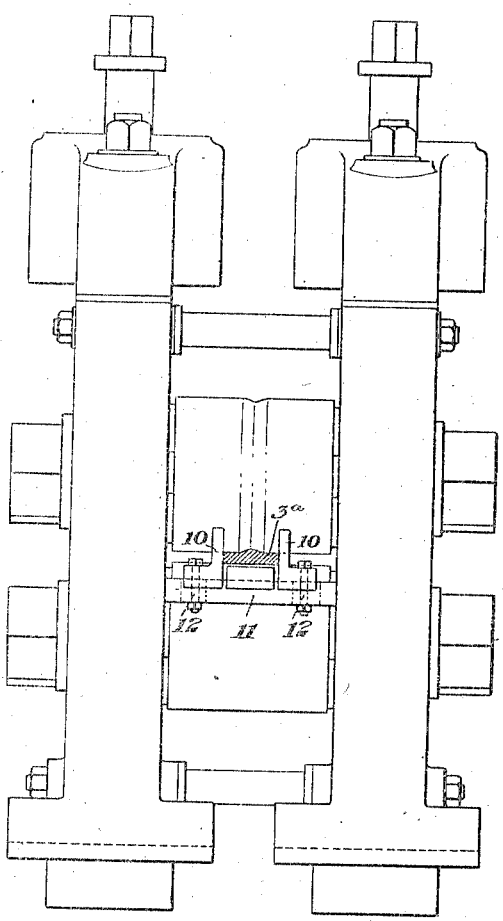

Figures 1 and 2 show the rolls of a mill having passes constructed in accordance with my invention. Figs. 3, 4, 5, 6, 7, 8, 9, 10, and 11 show the successive passes of a continuous mill embodying my invention. Figs. 12 to 17 show rolls having passes adapted to form angles with legs of various proportions. Fig. 18 is a plan view showing rolls in diagram of a continuous mill embodying my invention. Fig. 19 shows a partly-continuous mill. Fig. 20 is a front elevation, and Fig. 21 a broken vertical section, showing adjustable guides which I prefer to employ.

My invention relates to the rolling of angles, and is designed to obviate the difficulties heretofore experienced when such angles are rolled from billets, due to the unequal wear upon the passes of the rolls and the difficulty of adjusting the rolls to the thickness of the product without making the angles uneven or straining the metal.

My invention also enables me to roll angles in a continuous mill with the least possible changing of the rolls, the method involved being claimed in my copending application, Serial No. 166,525, filed July 22, 1903.

In Figs. 1 and 2 of the drawings 1 and 2 are the passes of a three-high mill for the billet from which the angle-iron is formed. 3 and 4 are the next passes of the rolls, in which a projection $b$ is formed on the piece to constitute the corner or back of the angle. The next pass 5 is an edging-pass. I show several of these passes for forming angles of different widths. In the next pass 6 (shown in Fig. 2) there is a further development of the corner $b$, as also in the next pass 7. In the pass 8 the legs of the angle, which hitherto were in substantially the same plane, are bent into angular form, and in the final pass 9 the angle is finished. Throughout these passes the parts constituting the legs of the angle are substantially straight and not dished or of butterfly form. The consequence is that if it is desired to adjust the rolls to vary the thickness of the legs of the angle such adjustment will not cause wear on the rolls nor any distortion or unevenness of the metal, but will vary the thickness equally at all points. It will be noted that the passes 6, 7, 8, and 9 are closed box-passes.

Figure 3:
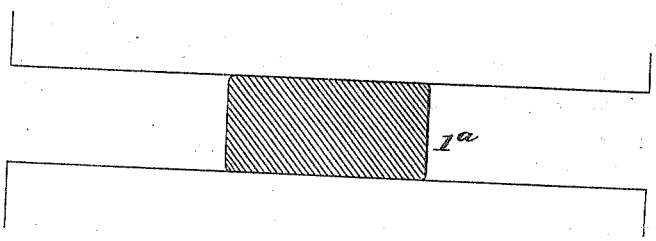
Figure 4:
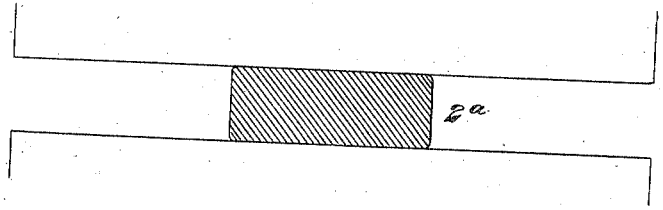
Figure 5:
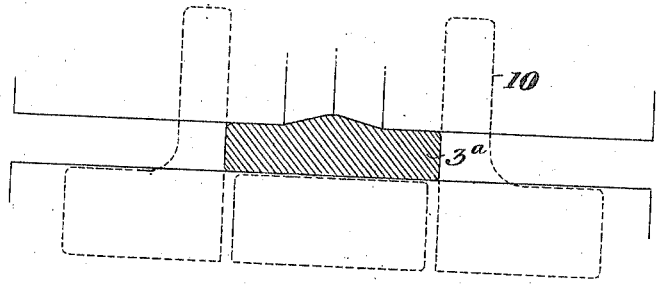
Figure 6:
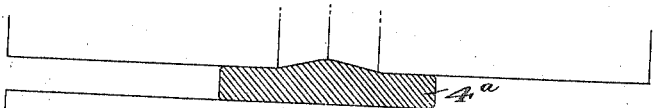
Figure 7:
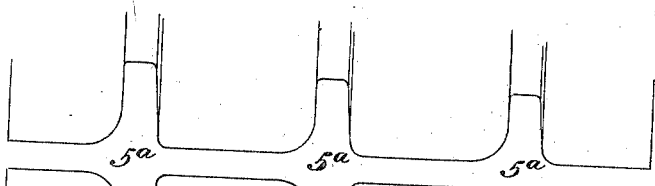
Figure 8:
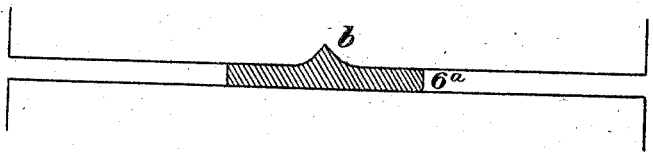
Figure 9:
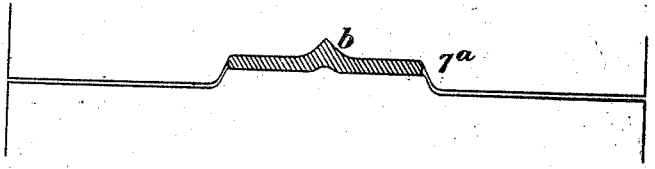
Figure 10:
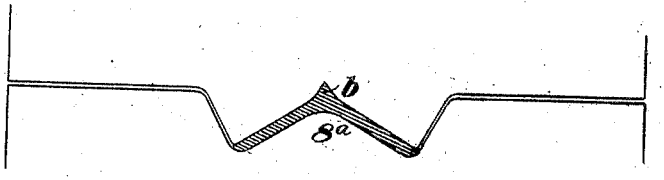
Figure 11:
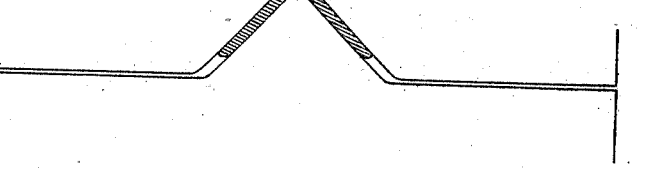

On Sheets 3 and 4 I show the roll-passes of a continuous mill embodying my invention. Figs. 3 and 4 show the roughing-passes $1^a$ and $2^a$, and Figs. 5, 6, and 7 show the passes $3^a$ $4^a$ $5^a$ corresponding to the passes 3, 4, and 5 of Fig. 1. Figs. 8, 9, 10, and 11 show passes $6^a$, $7^a$, $8^a$, and $9^a$ corresponding to the similarly-numbered passes shown in Fig 2. The passes $7^a$, $8^a$, and $9^a$ are shown as closed box-passes.

On Sheet 5 I show the roll-passes adapted to make angles having varying proportions of legs without the frequent changing of rolls which would be necessary if my invention were not employed. Figs. 12, 13, 14, 15, 16, 17 show passes $3^b$ $4^b$ and 6 $7^b$ $8^b$ $9^b$ corresponding to the similarly-numbered passes of Figs. 1 and 2. The roughing-passes and edging-pass are not shown, while the passes $7^b$, $8^b$, and $9^b$ are closed box-passes.

Figure 21:
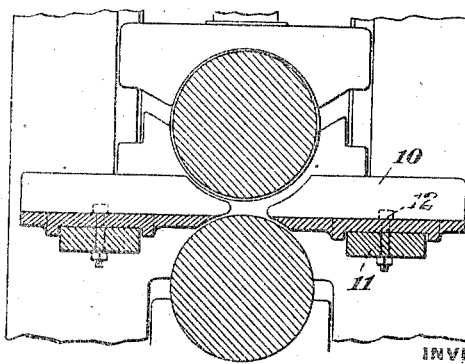

In the passes of Figs. 12, 13, and 14 one of the rolls A is plain and the other roll B grooved to form the corner $b$. To determine the proportional width of the legs of the angle, I use laterally-adjustable guides 10 10, and by shifting these guides I may roll angles having legs of various widths either equal or unequal without changing these rolls. These guides are shown in Figs. 20 and 21, being adjustably held to cross-supports 11 by means of bolts 12, extending through elongated slots in the supports and through the bases of the guides.

I show no adjustable guides for the passes of Figs. 15, 16, and 17, but the pass of Fig. 15 may be provided with such guides, in which case the rolls need not be changed when the proportional width of the legs is desired to be changed.

My invention enables me for the first time to roll angles successfully in a continuous mill, in which adjustable rolls are set with their passes in line. I show such mill in Fig. 18 of the drawings, in which C D E F G H I J K are the stands of rolls, which are adjustable to vary the thickness of the metal. In Fig. 19 I show a mill partly continuous, in which some of the passes are at one side of the line of the others and in which transfer devices are used. In this form the stands of rolls in which passes 5, 6, 7, and 8 are formed are three high, as indicated by the arrows, while the standing forming passes 1, 2, 3, and 4 are two-high mills arranged in continuous fashion.

Those skilled in the art will be able to vary somewhat the shape of the successive passes without departure from my invention as stated in the claims, since

What I claim is—

1. A mill for rolling angles comprising adjustable rolls, having separate passes shaped to form a flat blank with a ridge on one side and lateral legs or flanges and to substantially preserve the proportionate areas of the ridge and flange portions and maintain the flanges in substantially the same plane, while reducing the thickness of the blank and the cross-sectional area of the ridge and flange portions, rolls having an edging-pass, in which the width of the blank is fixed, and rolls having passes in which blanks of different thicknesses and widths are bent into angle form along the line opposite to the ridge, without changing the roughing-rolls; substantially as described.

2. A mill for rolling angles comprising adjustable rolls, having separate passes shaped to form a flat blank with a ridge on one side and lateral legs or flanges and to substantially preserve the proportionate areas of the ridge and flange portions and maintain the flanges in substantially the same plane, while reducing the thickness of the blank and the cross-sectional area of the ridge and flange portions, means for adjusting the rolls in repeating the operation on other blanks, and rolls having passes in which blanks of different thicknesses and widths are bent into angle form along the line opposite to the ridge, without changing the roughing-rolls; substantially as described.

3. A mill for rolling angles comprising adjustable rolls, having separate passes shaped to form a flat blank with a ridge on one side and lateral legs or flanges and to substantially preserve the proportionate areas of the ridge and flange portions and maintain the flanges in substantially the same plane, while reducing the thickness of the blank and the cross-sectional area of the ridge and flange portions, rolls having an edging-pass, in which the width of the blank is fixed, means for adjusting the rolls in repeating the operation on other blanks, and rolls having passes in which blanks of different thicknesses and widths are bent into angle form along the line opposite to the ridge, without changing the roughing-rolls; substantially as described.

4. A mill for rolling angles comprising adjustable rolls, having separate passes shaped to form a flat blank with a ridge on one side and lateral legs or flanges and to substantially preserve the proportionate areas of the ridge and flange portions and maintain the flanges in substantially the same plane while reducing the thickness of the blank and the cross-sectional area of the ridge and flange portions, rolls having an edging-pass, in which the width of the blank is fixed, rolls having passes forming a groove in the flat side of the blank opposite the ridge, and rolls having passes in which blanks of different thicknesses and widths are bent into angle form along the line opposite to the ridge, without changing the roughing-rolls; substantially as described.

5. A mill for rolling angles comprising adjustable rolls, having separate passes shaped to form a flat blank with a ridge on one side and lateral legs or flanges and to substantially preserve the proportionate areas of the ridge and flange portions and maintain the flanges in substantially the same plane, while reducing the thickness of the blank and the cross-sectional area of the ridge and flange portions, rolls having an adjustable edging-pass, in which the width of the blank is fixed, and a separate set of rolls having passes in which blanks of different thicknesses and widths are bent into angle form along the line opposite to the ridge, without changing the roughing-rolls; substantially as described.

6. A mill for rolling angles comprising adjustable rolls, having separate passes shaped to form a flat blank with a ridge on one side and lateral legs or flanges and to substantially preserve the proportionate areas of the ridge and flange portions and maintain the flanges in substantially the same plane, while reducing the thickness of the blank and the cross-sectional area of the ridge and flange portions, rolls having an edging-pass, in which the width of the blank is fixed, separate rolls in which the thickness of the blank and the cross-sectional area of the ridge and flange portions are further reduced, and rolls having passes in which blanks of different thicknesses and widths are bent into angle form along the line opposite to the ridge, without changing the roughing-rolls; substantially as described.

7. A mill for rolling angles comprising adjustable rolls, having separate passes shaped to form a flat blank with a ridge on one side and lateral legs or flanges, one of which is wider than the other, and to substantially preserve the proportionate areas of the ridge and flange portions and maintain the flanges in substantially the same plane, while reducing the thickness of the blank and the cross-sectional area of the ridge and flange portions, rolls having an edging-pass, in which the width of the blank is fixed, and rolls having passes in which blanks of different thicknesses and widths are bent into angle form along the line opposite to the ridge, without changing the roughing-rolls; substantially as described.

8. A mill for rolling angles comprising adjustable rolls, having separate passes shaped to form a flat blank with a ridge on one side and flat legs or flanges and to substantially preserve the proportionate areas of the ridge and flange portions and maintain the flanges in substantially the same plane, while reducing the thickness of the blank and the cross-sectional area of the ridge and flange portions, rolls having an edging-pass, in which the width of the blank is fixed, and rolls having passes in which blanks of different thicknesses and widths are bent into angle form along the line opposite to the ridge, without changing the roughing-rolls; substantially as described.

9. A mill for rolling angles comprising rolls adapted to form a flat blank having a ridge with flat legs or flanges, successive rolls having an edging-pass in which the width of the blank is fixed and further rolls having passes in which the blank is further reduced and final rolls in which the flat blank is bent into angle form; substantially as described.

10. A mill for rolling angles comprising rolls having open passes and adapted to form a flat blank having a ridge with flat legs or flanges, successive rolls having an edging-pass in which the width of the blank is fixed, and further rolls having passes in which the blank is further reduced and final rolls in which the flat blank is bent into angle form; substantially as described.

11. A mill for rolling angles comprising adjustable rolls, having open passes shaped to form a flat blank with a ridge on one side and flat legs or flanges, and to substantially preserve the proportionate areas of the ridge and flange portions and maintain the flanges in substantially the same plane, while reducing the thickness of the blank and the cross-sectional area of the ridge and flange portions, rolls having an edging-pass, in which the width of the blank is fixed, and rolls having passes in which blanks of different thicknesses and widths are bent into angle form along the line opposite to the ridge, without changing the roughing-rolls; substantially as described.

12. A mill for rolling angles comprising adjustable rolls, having open passes shaped to form a flat blank with a ridge on one side and lateral legs or flanges, one of which is wider than the other, and to substantially preserve the proportionate areas of the ridge and flange portions and maintain the flanges in substantially the same plane, while reducing the thickness of the blank and the cross-sectional area of the ridge and flange portions, rolls having an edging-pass, in which the width of the blank is fixed, and rolls having passes in which blanks of different thicknesses and widths are bent into angle form along the line opposite to the ridge, without changing the roughing-rolls; substantially as described.

13. A mill for rolling angles comprising adjustable rolls, having open passes shaped to form a flat blank with a ridge on one side and lateral legs or flanges and to substantially preserve the proportionate areas of the ridge and flange portions and maintain the flanges in substantially the same plane, while reducing the thickness of the blank and the cross-sectional area of the ridge and flange portions, rolls having an edging-pass, in which the width of the blank is fixed, and rolls having passes in which blanks of different thicknesses and widths are bent into angle form along the line opposite to the ridge, without changing the roughing-rolls; substantially as described.

In testimony whereof I have hereunto set my hand.

EDWIN E. SLICK.

Witnesses:
 THOMAS W. BAKEWELL,
 L. M. REDMAN.